United States Patent
Schreyer et al.

[15] 3,697,602
[45] Oct. 10, 1972

[54] PROCESS FOR THE PRODUCTION OF LOWER ALIPHATIC MERCAPTANS

[72] Inventors: Gerd Schreyer, Grossauheim; Wolfgang Weigert, Offenbach, both of Germany

[73] Assignee: Deutsche Gold- und Silber-Scheideanstalt vormals Roessler, Frankfurt (Main), Germany

[22] Filed: July 2, 1969

[21] Appl. No.: 838,398

[52] U.S. Cl. ............................................. 260/609 R
[51] Int. Cl. .......................................... C07c 149/14
[58] Field of Search ................................. 260/609 A

[56] References Cited

UNITED STATES PATENTS 2,797,191    6/1957    Jarboe et al........260/609 A X

*Primary Examiner*—Joseph Rebold
*Assistant Examiner*—D. R. Phillips
*Attorney*—Cushman, Darby & Cushman

[57] ABSTRACT

Lower alkyl mercaptans prepared from alkanols and hydrogen sulfide are obtained in pure form by separating the gaseous mixture of hydrogen sulfide, alkanol, alkyl mercaptan, dialkyl sulfide, water, dialkyl ether and inert gases at a pressure up to 10 atm. (gauge) and a temperature of 10° to 140° C. into volatile and non-volatile portions, the volatiles washed countercurrently to remove entrained alkyl mercaptan and after separating of the volatile hydrogen sulfide and ethers from the mercaptan the mercaptan is further separated from the other non-volatiles as a substantially pure product.

11 Claims, 1 Drawing Figure

PATENTED OCT 10 1972 3,697,602
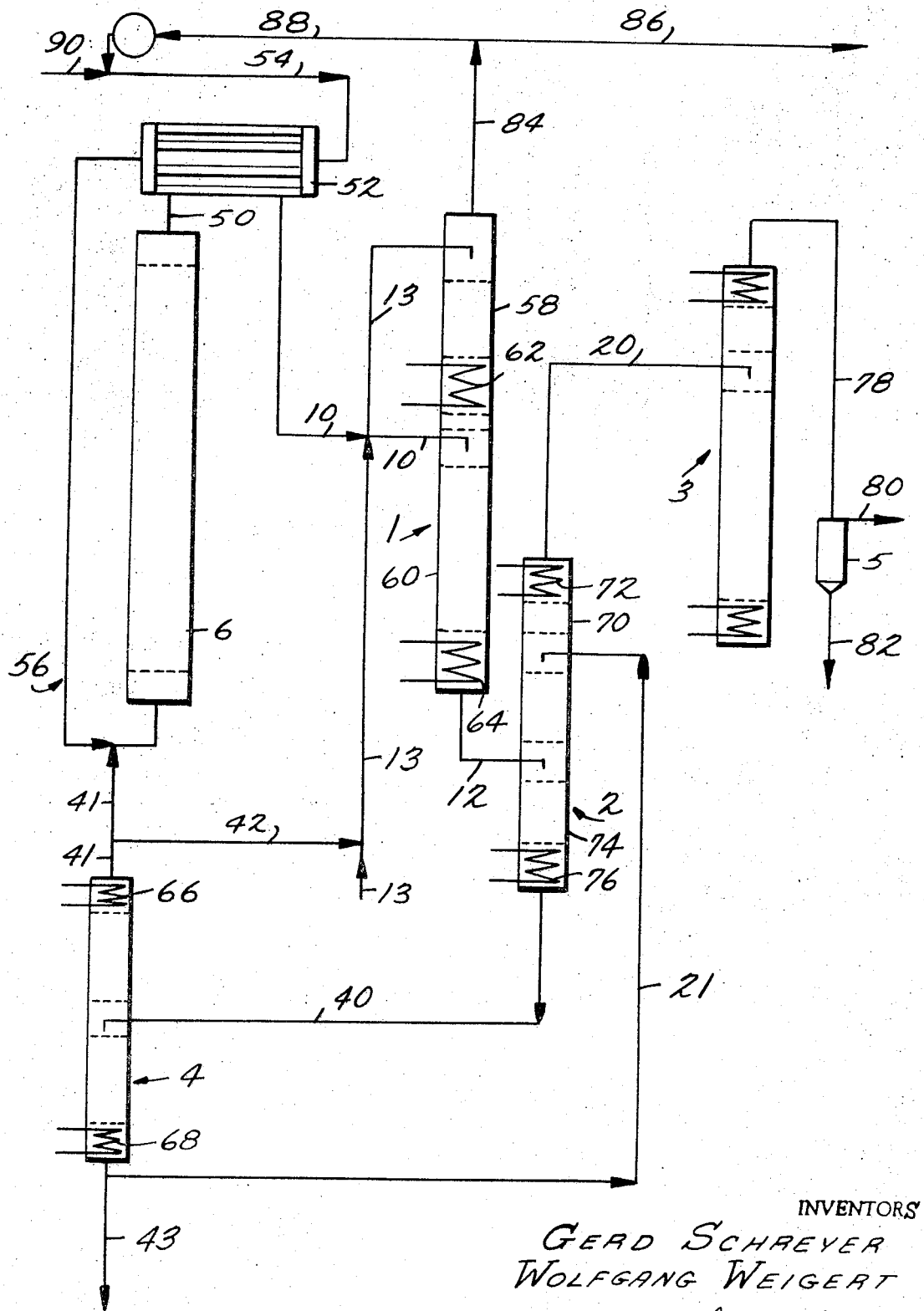
INVENTORS
GERD SCHREYER
WOLFGANG WEIGERT
BY Cushman, Darby & Cushman
ATTORNEYS

PROCESS FOR THE PRODUCTION OF LOWER ALIPHATIC MERCAPTANS

The present invention is concerned with the preparation of aliphatic mercaptans, particularly $C_1$–$C_4$ mercaptans, for example, methyl mercaptan, ethyl mercaptan, propyl mercaptan, butyl mercaptan, isobutyl mercaptan, sec. butyl mercaptan. It is known to prepare methyl mercaptan through the catalytic reaction of methanol or dimethyl ether with hydrogen sulfide. Similarly the other mercaptans can be prepared from hydrogen sulfide and e.g. ethyl alcohol, propyl alcohol, butanols or the corresponding ethers. Examples of suitable catalysts are, for example, thorium oxide (U.S. Pat. No. 2,685,605), aluminum oxide (German Pat. No. 1,134,368), activated aluminum oxide with various substances (U.S. Pat. Nos. 2,820,061-2-3, German Pat. No. 1,151,796). Potassium tungstate on aluminum oxide especially favors the formation of methyl mercaptan. This catalyst is not only active but also largely specific for the production of methyl mercaptan.

There are special difficulties in the working up of the reaction mixture which consists of unchanged starting materials, the mercaptan, the corresponding dialkyl sulfides and dialkyl ethers as well as water and inert gases. In the case of methyl mercaptan the mixture is composed of hydrogen sulfide and methanol as well as water, methyl mercaptan and the dimethyl sulfide and dimethyl ether formed as by products and also the gases inert in the reaction as, for example, methane, carbon monoxide, hydrogen and nitrogen. Through several fractional distillations and absorptions which follow one after the other at raised pressures portions of the products which still are present in the separated off hydrogen sulfide are lost. A part of the hydrogen sulfide must be eliminated from the process cycle in order that no inert products are enriched in the recycled hydrogen sulfide, see U.S. Pat. No. 2,808,441.

Nevertheless it is not possible to obtain a hydrogen sulfide free mercaptan by the described absorption process. According to German Pat. No. 1,134,368 it is known to undertake the reaction to recover methyl mercaptan and work up the reaction mixture at very high pressures, for example 17.5 to 24.5 atm. For this purpose especial expense for energy and pressure apparatus is necessary. The result is that loss of methyl mercaptan and hydrogen sulfide arises through increased solubility in water at the increased pressure so that a certain portion of these materials 90 away with the waste water.

An object of the invention is to reduce this loss, obtain practically quantitative recovery of mercaptan which contains less than 0.02 percent hydrogen sulfide and the avoidance of waste water which without extra working up cannot be sent to the sewer network or to the river.

It has now been found that aliphatic mercaptans which are free of hydrogen sulfide can be obtained in practically quantitative yield with less technical expense if the gas mixture leaving the reactor which has the above described composition and is under a pressure of at most 10 atm. (gauge), preferably 5 to 10 atm. (gauge) is separated in a distilling column which is either a packed column or plate column at a temperature of preferably 10° to 140° C. into the easily volatile portion containing hydrogen sulfide, dialkyl ether and inert gases and into a higher boiling portion containing water, alcohol, alkyl mercaptan and dialkyl sulfide. Thereupon, if necessary after cooling, the easily volatile materials can be washed free from the accompanying portion of alkyl mercaptan and dialkyl sulfide with wash liquid led countercurrent to the gas mixture in a column part above the distilling part or in a separate, so called wash column which likewise can be a packed column or plate column. The wash liquid laden with alkyl mercaptan and dialkyl sulfide which also still contains dissolved hydrogen sulfide and dialkyl ether again goes to the distillation column by use of a separate wash column. If only a single column is used the laden wash liquid flows out of the upper part of the distillation column counter to the rising gas mixture before it reaches the sump.

In both cases the hydrogen sulfide and dialkyl ether are stripped by the counter flowing vapor and arrive either in the separate wash column or in the upper part of the distillation column. The hydrogen sulfide, dialkyl ether and the inert gases, mercaptan and dialkyl sulfide free, pass from the wash column or the upper part of the distillation column and can for the most part be returned again to the reactor. A smaller part must be separated and burned or otherwise worked up in order not to become too enriched with inert material. The amount of this stream portion is adjusted according to the purity of the hydrogen sulfide added for the reaction. The purer this is the less is the amount separated. A very small part of this inert material arises from the reaction through a trifling destruction of the methanol.

It is an essential advantage of the mode of action according to the invention that even in the first step a quantitative separation of alkyl mercaptan and hydrogen sulfide results through a coupled stripping and washing. Therefore neither alkyl mercaptan appears in the gas mixture leaving overhead or hydrogen sulfide in the sump. At the same time the greatest part of the alkyl ether which is formed as by-product in the reaction is returned together with the hydrogen sulfide and there it is also reacted to alkyl mercaptan. The yield is thereby increased; the energy employed for this is less.

As already pointed out for this process both packing and plate columns are employed. The separation can be carried out as well in a column with an under part for stripping and an upper part for washing as also in two single columns. The cooling is undertaken either inside the column or in a separate cooler.

As wash means there can be employed those which are miscible with water such as the corresponding lower aliphatic alcohols such as methyl alcohol, ethyl alcohol, propyl alcohol, isopropyl alcohol, and butyl alcohol. Technical methanol is especially preferred for the production of methyl mercaptan. There also can be used water immiscible solvents having a low vapor pressure, for example, aliphatic, cycloaliphatic or aromatic high boiling hydrocarbons or mixtures, e.g. decane, dodecane, ethyl pelargonate, ethers, e.g. di n-butyl ether, di n-amyl ether, diisoamyl ether, di n-hexyl ether. Especially useful are alkyl benzenes having a boiling point over 160° C. Finally water itself can be added as the wash means.

To make the lower alkyl mercaptan by reaction with the hydrogen sulfide there can be used lower alkanols such as methyl alcohol, ethyl alcohol, isopropyl alcohol, n-propyl alcohol, n-butyl alcohol, isobutyl alcohol, sec. butyl alcohol and t-butyl alcohol.

As the catalyst there can be used any of the conventional catalysts including all of those in the aforementioned patents such as thoria, zirconia, activated alumina, titanium dioxide, tungsten oxide, $Mo_3O_8$, $Cr_3O_4$, $Cr_2O_3$, $V_2O_3$, $V_2O_4$, ZnO, CdO, $Mn_3O_4$, $MnO_2$, alumina mixed with any one of potassium sulfide, potassium sulfate, potassium carbonate, potassium chloride, tripotassium phosphate, dipotassium hydrogen phosphate, calcium oxide, strontium oxide, barium oxide, magnesium oxide, titanium oxide, sodium oxide, potassium oxide, rubidium oxide, cesium oxide, ferric oxide, cobalt oxide, copper oxide, nickel oxide, potassium tungstate, potassium molybdate, sodium tungstate, sodium vanadate, cadmium sulfide.

The invention will be understood best in connection with the drawings wherein the single FIGURE is a schematic flow diagram.

Referring more specifically to the drawings and considering methyl mercaptan production there is provided a reactor 6 containing catalyst between the horizontal dash lines. The gas mixture leaving the reactor goes through conduit 50, heat exchanger 52 and conduit 10 into column 1. Feed to the reactor 6 passes from conduit 54 through the heat exchanger 52 in countercurrent flow to the leaving gas mixture and then through conduit 56 to the bottom of the reactor 6. Column 1 consists of an upper part 58 and a lower part 60. The gas mixture enters the lower part 60 of the column from conduit 10 and separates into a gaseous phase, which primarily consists of hydrogen sulfide, inert gases, dimethyl ether and methyl mercaptan and rises into the upper part 58 of the column, and a liquid sump phase of methyl mercaptan, dimethyl sulfide, methanol, water and washing medium which runs out of the bottom of lower part 60. Column 1 is heated by a heat exchanger 64 and the exiting gases and reflux cooled or condensed through cooler 62.

As already explained the gas mixture rising in the upper column part 58 still contains methyl mercaptan and dimethyl sulfide, which are entrained corresponding to their vapor pressure above the cooler 62. In order to remove them washing medium is charged via conduit 13 above the packing or plates in the column and flows countercurrent to the gas and thereby takes up the methyl mercaptan and dimethyl sulfide. The washing agent is transported into lower part 60. Hydrogen sulfide and dimethyl ether are separated from the washing medium in this lower part of the column so that the washing medium together with methyl mercaptan, dimethyl sulfide, water and methanol fall as a hydrogen sulfide free sump product.

This sump is lead via conduit 12 into the middle part of column 2 which likewise is a plate or packed column. Methyl mercaptan and dimethyl sulfide go off at the top, methanol, water and washing medium fall as sump product.

Methanol passes over with the top product corresponding to the compositions of the azeotropic mixtures dimethyl sulfide-methanol and methyl mercaptan-methanol. In case a methanol content is disturbing in product methyl mercaptan and dimethyl sulfide the named azeotropes can be separated by extractive distillation through additional water feeding into the upper part of column 2 by conduit 21.

In case, however, methanol is not disturbing in the end product the methyl mercaptan contains as much methanol as corresponds to the azeotrope, that is 1 to 2 percent methanol in the methyl mercaptan. Small amounts of water always pass over the top of columns 2 and 3. The top product of column 2 goes via conduit 20 into a further packed or plate column 3 and is distilled pure. Methyl mercaptan is collected in a purity of over 98 percent, with additional feeding of water in column 2 in a purity of over 99.6 percent, and contains less than 0.02 percent hydrogen sulfide. The water was separated in a separating vessel 5 and perhaps recycled over conduit 82 to conduit 10 or 21.

The manner of recovery of the washing medium depends on itself. The washing medium, however, in all cases, contrary to the state of the art (see, for example Ind. Eng. Chem. Vol. 1 pages 271–276 (1962)), is not separately treated but is worked up in common with the sump from column 1 and 2.

If a water miscible washing medium is added, such as methanol, the sump from column 2 is lead via conduit 40 into a packed or plate column 4 which is provided with heat exchangers 66 and 68 and there the mixture of washing media and methanol leaving as overhead is separated from the water formed in the reaction, that is drawn off as sump product through conduit 43. This waste water is free of hydrogen sulfide, methyl mercaptan and other odoriferous materials and can be discharged into the sewer network or into the river.

The washing medium with the small portion of methanol not changed in the reaction is again passed via conduits 41, 42 and 13 to the top 58 of column 1. It carries the still present odoriferous material with it. If the washing medium is methanol itself preferably the amount necessary for the reaction can preferably be taken from the circulating washing medium stream via conduit 41. This amount is then replaced by fresh methanol through conduit 13. In the event the wash medium is not miscible with water the sump from column 2 is separated after cooling in a phase separation vessel (not shown). The wash medium can be immediately added again into column 1. Should the small amount of methanol which is found in the water arising from reaction be recovered, the water can in known manner and without great addition of energy be distilled methanol and odor free.

If water is added as the wash medium a corresponding part of the reaction water is separated off after leaving the sump of column 2. Since this part contains small amounts of methanol and odoriferous materials it is freed of these materials in a small column (not shown). The remaining part of the sump product can after cooling again be used for washing in lower part 60 of column 1.

Unless otherwise indicated all parts and percentages are by weight.

EXAMPLE I

This examples illustrates the production of methyl mercaptan.

A mixture leaving the reactor 6 having the composition 36.1 percent hydrogen sulfide, 2.5 percent methanol, 38.4 percent methyl mercaptan, 1.5 percent dimethyl ether, 2.7 percent dimethyl sulfide, 15.6 percent water and 3.2 percent inert gases was fed via conduit 10 into lower part 60 of column 1 at a pressure of 7 atm. (gauge). To the top 58 of the wash column 2.5 kilograms of methanol for washing were added per kilogram of methyl mercaptan. The temperature at the top of column 58 amounted to 25° C., below the cooler 48° C. in the sump (column part 60) 92° C. In the gas leaving the top part 58 of the column 1 that consisted predominately of hydrogen sulfide there was detected no methyl mercaptan or dimethyl sulfide.

The sump product from column 1 was fed into column 2 via conduit 12. Column 2 had an upper part 70 containing near the top heat exchanger 72 and a lower part 74 containing near the bottom heat exchanger 76. Shortly below the top of column 2 2.3 kilograms of water per kilogram of methyl mercaptan were fed via conduit 21. The column operating at 7 atm. (gauge), had a sump temperature of 149° C. and a head temperature of 72° C. The sump product of this column was led into column 4 operating at normal (atmospheric) pressure. The discharge in conduit 43 from this column was odor free water. The head product was used in part to feed the reactor via conduit 41 and the remaining part again used for washing in upper part 58 of column 1. The part detached for reactor 6 through conduit 41 was replaced by fresh methanol via conduit 13 in the washing in column 1. From the head product of column 2 methyl mercaptan was obtained after repeated distillation in column 3 which afterwards via conduit 78 ran through a water separator 5. The methyl mercaptan still contained 0.015 percent hydrogen sulfide and 0.15 percent methanol. The methyl mercaptan was lead off through conduit 80 and the water through conduit 82.

Hydrogen sulfide with its impurities leaving the top part 58 of column 1 went via conduit 84 to conduits 86 and 88, a portion being bled off via conduit 86 and the remainder passing via conduit 88 to conduit 54 where it mingled with additional reactants fed via conduit 90 to conduit 54.

In the specific example above the catalyst employed in reactor 6 was potassium tungstate on activated alumina.

EXAMPLE 2

This example illustrates the production of methyl mercaptan, whereby the gas mixture leaving the reactor 6 was washed with a mixture of tetramethylbenzenes instead of methanol. 1,9 kilograms of washing medium were used per kilogram of mercaptan produced.

The sump of column 2 was led to a water separator 4, in which the water was separated from the washing medium. The water was discharged, the washing medium fed back to the head of column 1.

What is claimed is:

1. In a process for the recovery of pure lower alkyl mercaptans through reaction of the corresponding alkanols and hydrogen sulfide in the presence of a catalyst under pressure, the improvement comprising separating the gaseous mixture of hydrogen sulfide, alkanol, alkyl mercaptan, dialkyl sulfide, water, dialkyl ether and inert gases in a separating column at a pressure of up to 10 atmospheres gauge and at a temperature of 10° to 140° C. into a volatile portion containing hydrogen sulfide, dialkyl ether, inert gases and entrained alkyl mercaptan and dialkyl sulfide and a non-volatile portion including water, alcohol, alkyl mercaptan, and dialkyl sulfide, countercurrently washing the volatile portion with a liquid wash medium selected from the group consisting of water, water soluble alcohols, high boiling hydrocarbons, high boiling alcohols, esters and ethers to remove the entrained mercaptan and dialkyl sulfide from the volatile portion while leaving the hydrogen sulfide and volatile ethers in the volatile portion, withdrawing said hydrogen sulfide and volatile ethers as a gas from the top part of the separating column, combining the alkyl mercaptan and dialkyl sulfide removed from said volatile portion with said non-volatile portion and thereafter further separating the combined alkyl mercaptan as a substantially pure product from the other non-volatiles.

2. A process according to claim 1 wherein the lower alkyl mercaptan is a primary mercaptan having one to four carbon atoms and the process includes separating the alkyl mercaptan by distilling the mercaptan.

3. A process according to claim 2 wherein the mercaptan is methyl mercaptan.

4. A process according to claim 2 wherein the wash medium is selected from the group consisting of water, water soluble alcohols and high boiling hydrocarbons.

5. A process according to claim 4 wherein the wash medium is a lower alcohol.

6. A process according to claim 5 wherein the wash medium is methanol and the mercaptan is methyl mercaptan.

7. A process according to claim 2 wherein the wash medium is a hydrocarbon boiling above 160° C.

8. A process according to claim 7 wherein the wash medium is water.

9. A process according to claim 1 wherein the separating column in which the primary amount of hydrogen sulfide is removed is at a pressure of 5 to 10 atm. (gauge).

10. A process according to claim 2 wherein the wash medium is methanol, the mercaptan is methyl mercaptan and the methanol recovered from the sump of the separatory column is employed as an addition product for the mercaptan forming reaction.

11. A process according to claim 1 wherein the mercaptan is methyl mercaptan and the non-volatile portion is subjected to distillation to form an azeotropic mixture of methanol-methyl mercaptan and methanol-dimethyl sulfide and extracting the distillate with the aid of water as the wash medium.

* * * * *